(12) United States Patent
Lee et al.

(10) Patent No.: US 11,825,166 B2
(45) Date of Patent: Nov. 21, 2023

(54) VIDEO PLAYBACK SYSTEM BASED ON APPROVAL OF PLAYBACK APPROVER

(71) Applicant: IDIS CO., LTD., Daejeon-si (KR)

(72) Inventors: Sang Hoon Lee, Seoul (KR); In Taek Lim, Goyang-si (KR); Jin Hui Park, Seoul (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 17/983,472

(22) Filed: Nov. 9, 2022

(65) Prior Publication Data
US 2023/0209140 A1    Jun. 29, 2023

(30) Foreign Application Priority Data
Nov. 11, 2021 (KR) ................. 10-2021-0154577

(51) Int. Cl.
*H04N 5/76* (2006.01)
*H04N 21/84* (2011.01)
*H04N 21/472* (2011.01)
*H04L 9/08* (2006.01)
*H04L 9/32* (2006.01)

(52) U.S. Cl.
CPC ..... *H04N 21/47217* (2013.01); *H04L 9/0819* (2013.01); *H04L 9/3228* (2013.01); *H04L 9/3231* (2013.01); *H04N 5/76* (2013.01); *H04N 21/84* (2013.01)

(58) Field of Classification Search
CPC .... H04N 21/47217; H04N 21/84; H04N 5/76; H04L 9/0819; H04L 9/3228; H04L 9/3231
See application file for complete search history.

(56) References Cited

U.S. PATENT DOCUMENTS

| | | | | |
|---|---|---|---|---|
| 7,136,487 | B1* | 11/2006 | Schon | G06Q 50/16 713/184 |
| 2005/0213234 | A1* | 9/2005 | Senshu | G11B 20/00086 |
| 2006/0123246 | A1* | 6/2006 | Vantalon | H04N 5/913 348/E7.06 |
| 2008/0320558 | A1 | 12/2008 | Imanishi et al. | |

(Continued)

FOREIGN PATENT DOCUMENTS

| KR | 10-1760095 B1 | 7/2017 |
|---|---|---|
| KR | 10-1810904 B1 | 12/2017 |

(Continued)

OTHER PUBLICATIONS

Notice of Allowance dated Feb. 27, 2023 from the Korean Patent Office for Korean Application No. 10-2021-0154577.

(Continued)

*Primary Examiner* — Thai Q Tran
*Assistant Examiner* — Jose M Mesa
(74) *Attorney, Agent, or Firm* — INSIGHT LAW GROUP, PLLC; Seung Lee

(57) ABSTRACT

Provided is a video playback system based on approval of a playback approver. A decryption key that can decrypt an encrypted and stored recorded video is generated only when video playback is approved by a playback approver using an appointed playback approval method and transmitted to the video recording device so that it is possible to prevent leakage of the recorded video with sensitive personal information.

17 Claims, 4 Drawing Sheets

(56) References Cited

U.S. PATENT DOCUMENTS

2017/0323542 A1 11/2017 Koh et al.
2019/0349755 A1 11/2019 Maia et al.
2020/0242903 A1 7/2020 Lee

FOREIGN PATENT DOCUMENTS

| KR | 10-2018-0000607 A | 1/2018 |
| KR | 10-1837188 B1 | 4/2018 |
| KR | 10-2140721 B1 | 7/2020 |
| KR | 10-22220746 B1 | 2/2021 |

OTHER PUBLICATIONS

Extended European Search Report dated Apr. 6, 2023 from the European Patent Office for European Application No. 22205549.3.

\* cited by examiner

VIDEO PLAYBACK SYSTEM BASED ON APPROVAL OF PLAYBACK APPROVER

CROSS-REFERENCE TO RELATED APPLICATION(S)

This application claims priority from Korean Patent Application No. 10-2021-0154577, filed on Nov. 11, 2021, in the Korean Intellectual Property Office, the disclosure of which is incorporated herein by reference in its entirety.

BACKGROUND

1. Field

The present invention relates to a video playback technique, and more particularly, to a video playback system based on approval of a playback approver.

2. Description of Related Art

In general, recorded video data of a video playback system can be played and exported by a manager regardless of whether the recorded video data is encrypted. In a general video playback system environment, this type of video playback and export is not a big problem.

However, when a video that is sensitive because of personal information is recorded in a place such as an operating room or the like, damage caused by leakage of the recorded video can be serious, and thus there is a need for a technique that not only ensures confidentiality due to encryption of recorded video data, but also prevents the recorded video from being played or exported in the case in which there is no consent from the subject of the video data being recorded.

In operating rooms and the like, in many cases, limited areas are recorded only at specific times, and thus a subject of video data remains unchanged for each recording unit (e.g., per operation). Therefore, different encryption/decryption keys may be easily set for each recorded video unit, and the subject of the video data is clear, and thus it is possible to designate a pre-approver.

Here, the subject of the video data is a person who can be identified through playback of the recorded video being recorded, and is a person who is a subject of the recorded video data. Meanwhile, the pre-approver (hereinafter referred to as a "playback approver") is a subject of video data, a parent or spouse of the subject of the video data, a legal representative of the subject of the video data, or the like.

Therefore, the present inventor has conducted research on a technique that enables a decryption key that can decrypt an encrypted and stored recorded video to be generated only when video playback is approved by the playback approver using an appointed playback approval method, and the generated decryption key to be transmitted to a video recording device to prevent leakage of a recorded video with sensitive personal information.

DOCUMENT OF RELATED ART

Patent Document

Korean Patent Registration No. 10-2220746 (published on Feb. 25, 2021)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a video playback system based on approval of a playback approver, which is capable of preventing leakage of a recorded video with sensitive personal information by generating a decryption key that can decrypt an encrypted and stored recorded video only when video playback is approved by a playback approver using an appointed playback approval method, and transmitting the generated decryption key to a video recording device.

The following description also relates to a video playback system based on approval of a playback approver, which is capable of restricting export of a recorded video with sensitive personal information by permitting the export of an encrypted recorded video stored after being recorded by a video recording device only when video export is approved by a playback approver using an appointed playback approval method.

The following description also relates to a video playback system based on approval of a playback approver, which is capable of designating and managing a playback approver and a playback approval method for each recording unit.

In one general aspect, a video playback system based on approval of a playback approver which includes a video playback approval server including a recording start processing unit configured to receive video recording start notification information including metadata including playback approver information and playback approval method information from a video recording device, and notify a playback approver corresponding to the playback approver information included in the metadata that video recording is starting, a key management unit configured to, after the recording start processing unit notifies that the video recording is starting, generate an encryption key for encrypting a recorded video and a unique key for requesting a decryption key for decrypting the encrypted recorded video, and transmit the generated encryption key and unique key to the video recording device, a playback-related information storage unit configured to match and store the metadata including the playback approver information and the playback approval method information, the encryption key for encrypting the recorded video, and the unique key for requesting the decryption key for decrypting the encrypted recorded video in a database (DB), and a recording end processing unit configured to receive video recording end notification information from the video recording device, and notify the playback approver corresponding to the playback approver information included in the metadata that the video recording is ending.

The video playback approval server may further include a video playback approval requesting unit configured to, upon receiving decryption key request information including the unique key from the video recording device that has received a recorded video playback request from a playback requester, verify the unique key and then request video playback approval from the playback approver corresponding to the playback approver information included in the metadata using a playback approval method, and a decryption key transmission unit configured to, when the video playback is approved by the playback approver that has received the video playback approval request using the playback approval method, transmit the decryption key for decrypting the encrypted recorded video to the video recording device.

The playback approval method may be a method using a one-time password (OTP) or biometrics.

The playback approver information may be an email address or a mobile terminal's phone number.

The notification that the video recording is starting and the notification that the video recording is ending may be transmitted to the playback approver through email, a short message service (SMS), a multimedia message service (MMS), or a social network service (SNS).

The video playback approval server may further include a video export approval requesting unit configured to receive export request information on the recorded video from the video recording device, and request video export approval from the playback approver corresponding to the playback approver information included in the metadata using the playback approval method, and a video export permitting unit configured to, when the video export is approved by the playback approver that has received a video export approval request using the playback approval method, transmit export permission information on the recorded video to the video recording device.

The video playback approval requesting unit may be implemented to, when the video playback approval requesting unit receives the decryption key request information including the unique key from a terminal of the video exporter, to which the recorded video has been exported, verify the unique key and then request the video playback approval from the playback approver corresponding to the playback approver information included in the metadata using the playback approval method.

The decryption key transmission unit may be implemented to, when the video playback is approved by the playback approver that has received the video playback approval request using the playback approval method, transmit the decryption key for decrypting the encrypted recorded video to the video exporter terminal.

The metadata may further include information on an encryption method and information on an encryption key length.

The encryption method may be any one of a full encryption method, a partial encryption method, and a network abstraction layer (NAL) unit encryption method.

The metadata may further include additional information for searching for the recorded video.

The additional information may include at least one of a recording location, a recording time, and a recording participant of the recorded video.

The video playback system based on approval of the playback approver may further include an Internet protocol (IP) camera configured to capture a video, and a video recording device configured to record and store the video captured through the IP camera.

The video recording device may be implemented to generate metadata including playback approver information and playback approval method information for each recording unit and transmit video recording start notification information to the video playback approval server.

The video recording device may be implemented to discard the encryption key received from the video playback approval server when the video recording ends.

The video recording device may be implemented to discard the decryption key received from the video playback approval server when the video recording ends.

The video recording device may perform multi-channel recording, and may be implemented in the form of a hybrid recording system in which the video playback approval server occupies only some of a plurality of channels and performs video playback management based on the approval of the playback approver.

Other features and aspects will be apparent from the following detailed description, the accompanying drawings, and the claims.

Figure 1:
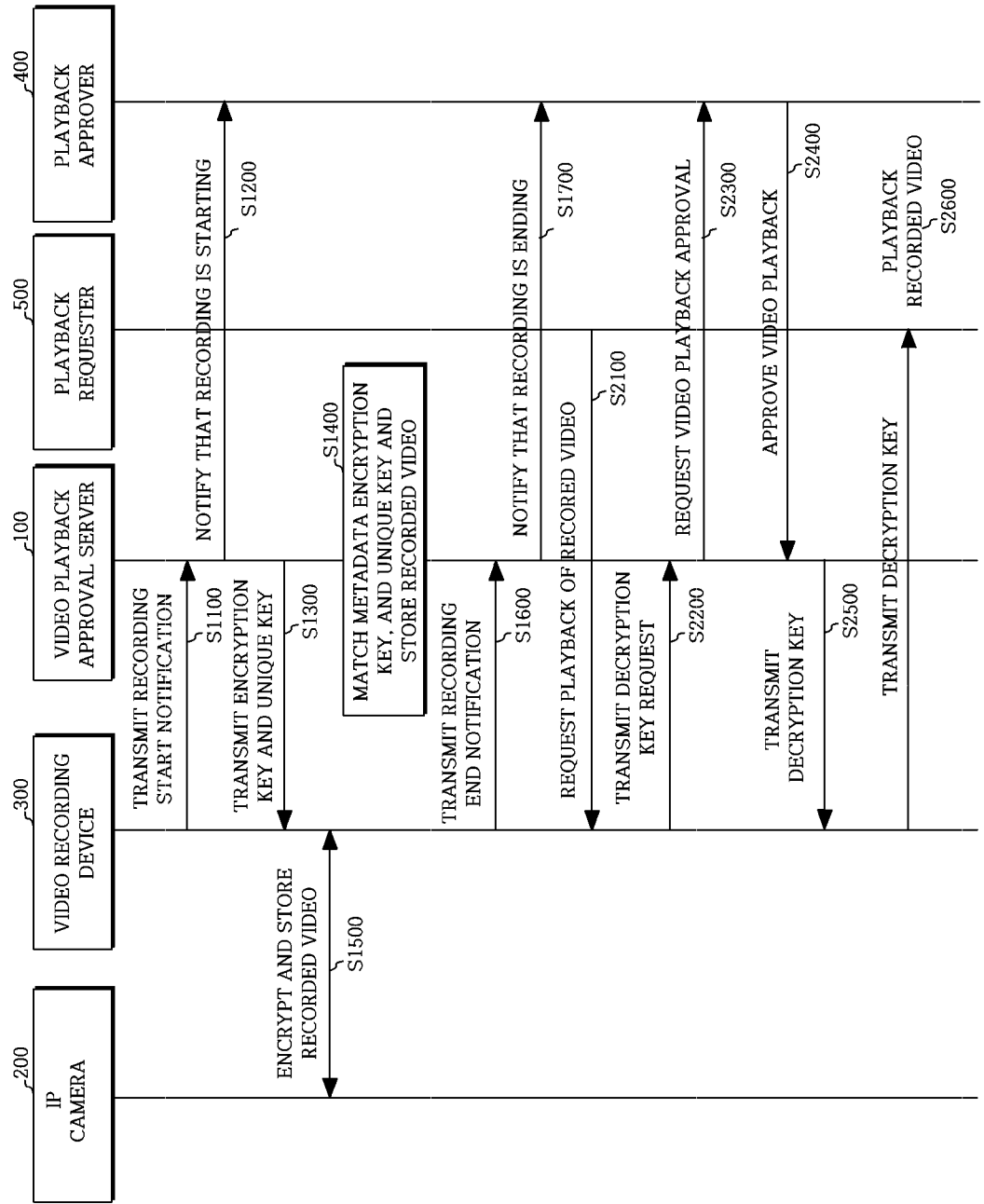
FIG. 1 is a schematic network diagram of a video playback system based on approval of a playback approver according to the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, in order to facilitate understanding and playback by those skilled in the art, the present invention will be described in detail by explaining exemplary embodiments with reference to the accompanying drawings. While specific embodiments are illustrated in the drawings and detailed descriptions related thereto are given, there is no intent to limit various embodiments of the present invention to the particular forms.

When it is deemed that detailed descriptions of related well-known functions or configurations may unnecessarily obscure the gist of the present invention, detailed descriptions thereof will be omitted.

It will be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements present.

FIG. 1 is a schematic network diagram of a video playback system based on approval of a playback approver according to the present invention. As illustrated in FIG. 1, the video playback system based on approval of the playback approver according to the present invention includes a video playback approval server 100, an Internet protocol (IP) camera 200, and a video recording device 300.

The video playback approval server 100 matches, stores, and manages metadata including playback approver information and playback approval method information, an encryption key for encrypting a recorded video, and a unique key for requesting a decryption key for decrypting an encrypted recorded video.

Meanwhile, the video playback approval server 100 generates a decryption key that can decrypt an encrypted and stored recorded video only when video playback is approved by a playback approver using an appointed playback approval method, and transmits the generated decryption key to the video recording device 300.

The IP camera 200 captures a video. For example, the IP camera 200 may be installed in an operating room or the like and implemented to capture a video of a surgery performed in the operating room and transmit the captured video of the surgery to the video recording device 300 connected through a wired/wireless network, but the present invention is not limited thereto.

The video recording device 300 controls the IP camera 200, and records and stores a video captured through the IP camera 200. In this case, the video recording device 300 may be implemented to encrypt and store the recorded video using a specific encryption key and encryption method. In this case, the encryption key and encryption method may be generated and managed by the video playback approval server 100.

In the video playback system based on approval of the playback approver according to the present invention, the video playback approval server 100 may generate the decryption key that can decrypt the encrypted and stored recorded video only when the video playback is approved by the playback approver using the appointed playback approval method, and transmit the generated decryption key to the video recording device 300, and thus it is possible to prevent leakage of the recorded video with sensitive personal information, which is captured by the IP camera 200 and stored after being encrypted by the video recording device 300.

Figure 2:
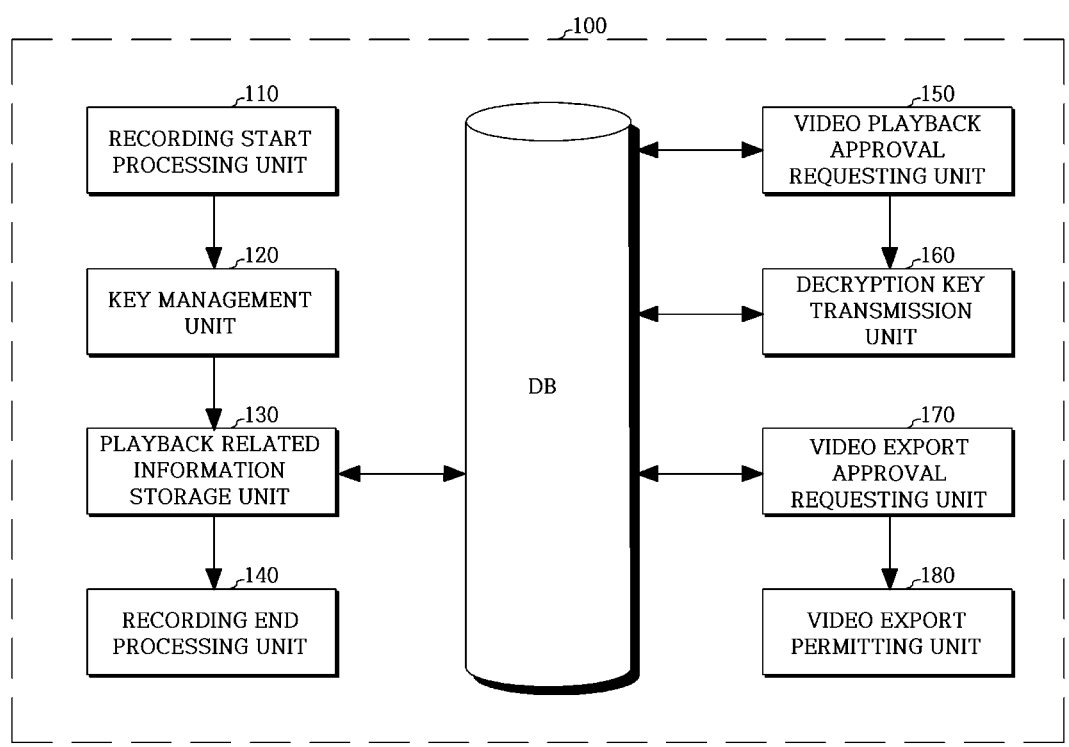
FIG. 2 is a block diagram illustrating a configuration of an embodiment of a video playback approval server of a video playback system based on approval of a playback approver according to the present invention.

FIG. 2 is a block diagram illustrating a configuration of an embodiment of a video playback approval server of the video playback system based on approval of the playback approver according to the present invention. As illustrated in FIG. 2, the video playback approval server 100 according to this embodiment includes a recording start processing unit 110, a key management unit 120, a playback-related information storage unit 130, and a recording end processing unit 140.

The recording start processing unit 110 receives video recording start notification information including metadata including playback approver information and playback approval method information from the video recording device 300, and notifies the playback approver 400 corresponding to the playback approver information included in the metadata that video recording is starting.

Before the video recording is performed, the video recording device 300 determines the playback approver and the playback approval method and then transmits the video recording start notification information including the metadata including the playback approver information and the playback approval method information to the video playback approval server 100 (S1100).

Then, the recording start processing unit 110 of the video playback approval server 100 receives the video recording start notification information including the metadata including the playback approver information and the playback approval method information from the video recording device 300, and notifies the playback approver 400 corresponding to the playback approver information included in the metadata that the video recording is starting (S1200).

In this case, the playback approval method may be a method using a one-time password (OTP) or biometrics, but the present invention is not limited thereto. Meanwhile, the playback approver information may be an email address or a mobile terminal's phone number, but the present invention is not limited thereto.

For example, the notification that the video recording is starting performed by the recording start processing unit 110 may be transmitted to the playback approver 400 through email using an email address or through a short message service (SMS), a multimedia message service (MMS), or a social network service (SNS) using a mobile terminal's phone number.

After the recording start processing unit 110 notifies that the video recording is starting, the key management unit 120 generates an encryption key for encrypting a recorded video and a unique key for requesting a decryption key for decrypting an encrypted recorded video and transmits the generated encryption key and unique key to the video recording device 300 (S1300).

The playback-related information storage unit 130 matches the metadata including the playback approver information and the playback approval method information, the encryption key for encrypting the recorded video, and the unique key for requesting the decryption key for decrypting the encrypted recorded video to be stored in a database (DB) (S1400).

Then, the video recording device 300 that has received the encryption key for encrypting the recorded video and the unique key for requesting the decryption key for decrypting the encrypted recorded video records the video captured by the IP camera 200, encrypts the recorded video using the encryption key, and stores the recorded video (S1500). In this case, the encryption key may be a symmetric-key-based encryption key or an asymmetric-key-based encryption key.

The recording end processing unit 140 receives video recording end notification information from the video recording device 300, and notifies the playback approver 400 corresponding to the playback approver information included in the metadata that the video recording is ending.

When the video recording ends, the video recording device 300 transmits the video recording end notification information to the video playback approval server 100 (S1600). Then, the recording end processing unit 140 of the video playback approval server 100 receives the video recording end notification information from the video recording device 300, and notifies the playback approver 400 corresponding to the playback approver information included in the metadata that the video recording is ending (S1700).

For example, the notification that the video recording is ending performed by the recording end processing unit 140 may be transmitted to the playback approver 400 through email using an email address or through an SMS, an MMS, or an SNS using a mobile terminal's phone number.

By implementing the present invention in this way, the video playback approval server 100 may notify and inform the playback approver 400 of when the video recording is starting and when the video recording is ending, and the video recording device 300 may encrypt and store the recorded video using the encryption key generated by the video playback approval server 100, and thus it is possible to protect the personal information.

Meanwhile, according to an additional aspect of the present invention, in order to play the recorded video stored after being encrypted by the video recording device 300, the video playback approval server 100 may further include a video playback approval requesting unit 150 and a decryption key transmission unit 160.

When the video playback approval requesting unit 150 receives decryption key request information including the unique key from the video recording device 300 that has received a recorded video playback request from a playback requester 500, the video playback approval requesting unit 150 verifies the unique key and then requests video playback approval from the playback approver 400 corresponding to the playback approver information included in the metadata using the playback approval method.

For example, when the encrypted recorded video stored after being recorded by the video recording device 300 is a video of a surgery for the playback approver and when a medical accident is suspected after the surgery and the playback approver has filed a medical accident report with an institution such as a police station or a prosecutor's office, a playback requester (e.g., police officer or prosecutor) requests playback of the recorded video from the video recording device 300 (S2100).

Then, the video recording device 300 transmits the decryption key request information including the unique key that is received together with the encryption key from the video playback approval server 100 to the video playback approval server 100 (S2200). In this case, the unique key is a key for requesting the decryption key for decrypting the recorded video encrypted using the encryption key.

Then, the video playback approval requesting unit 150 of the video playback approval server 100 receives the decryption key request information including the unique key, verifies whether the unique key is a previously issued unique key, and then requests the video playback approval from the playback approver 400 corresponding to the playback approver information included in the metadata using the playback approval method (S2300).

For example, the video playback approval requesting unit 150 may be implemented to request the video playback approval by inputting an OTP to the playback approver 400 through email using an email address or through an SMS, an MMS, or an SNS using the mobile terminal's phone number, or to request the video playback approval by providing an interface for inputting information on biometrics such as a fingerprint or iris.

When the video playback is approved by the playback approver 400 that has received the video playback approval request using the playback approval method, the decryption key transmission unit 160 transmits the decryption key for decrypting the encrypted recorded video to the video recording device 300.

When the playback approver 400 that has received the video playback approval request enters an OTP or enters information on biometrics such as a fingerprint or iris to approve the video playback (S2400), the decryption key transmission unit 160 of the video playback approval server 100 transmits the decryption key for decrypting the encrypted recorded video to the video recording device 300 (S2500).

Then, the video recording device 300 that has received the decryption key for decrypting the encrypted recorded video from the video playback approval server 100 transmits the decryption key to the playback requester 500 so that the encrypted recorded video stored in the video recording device 300 is decrypted using the decryption key and played (S2600).

By implementing the present invention in this way, the decryption key that can decrypt the encrypted and stored recorded video may be generated only when video playback is approved by the playback approver using the appointed playback approval method, and transmitted to the video recording device to prevent leakage of the recorded video with sensitive personal information, and thus it is possible to efficiently protect the personal information.

Meanwhile, according to an additional aspect of the present invention, in order to export the recorded video stored after being encrypted by the video recording device 300, the video playback approval server 100 may further include a video export approval requesting unit 170 and a video export permitting unit 180.

The video export approval requesting unit 170 receives export request information on the recorded video from the video recording device 300, and requests video export approval from the playback approver 400 corresponding to the playback approver information included in the metadata using the playback approval method.

Figure 3:
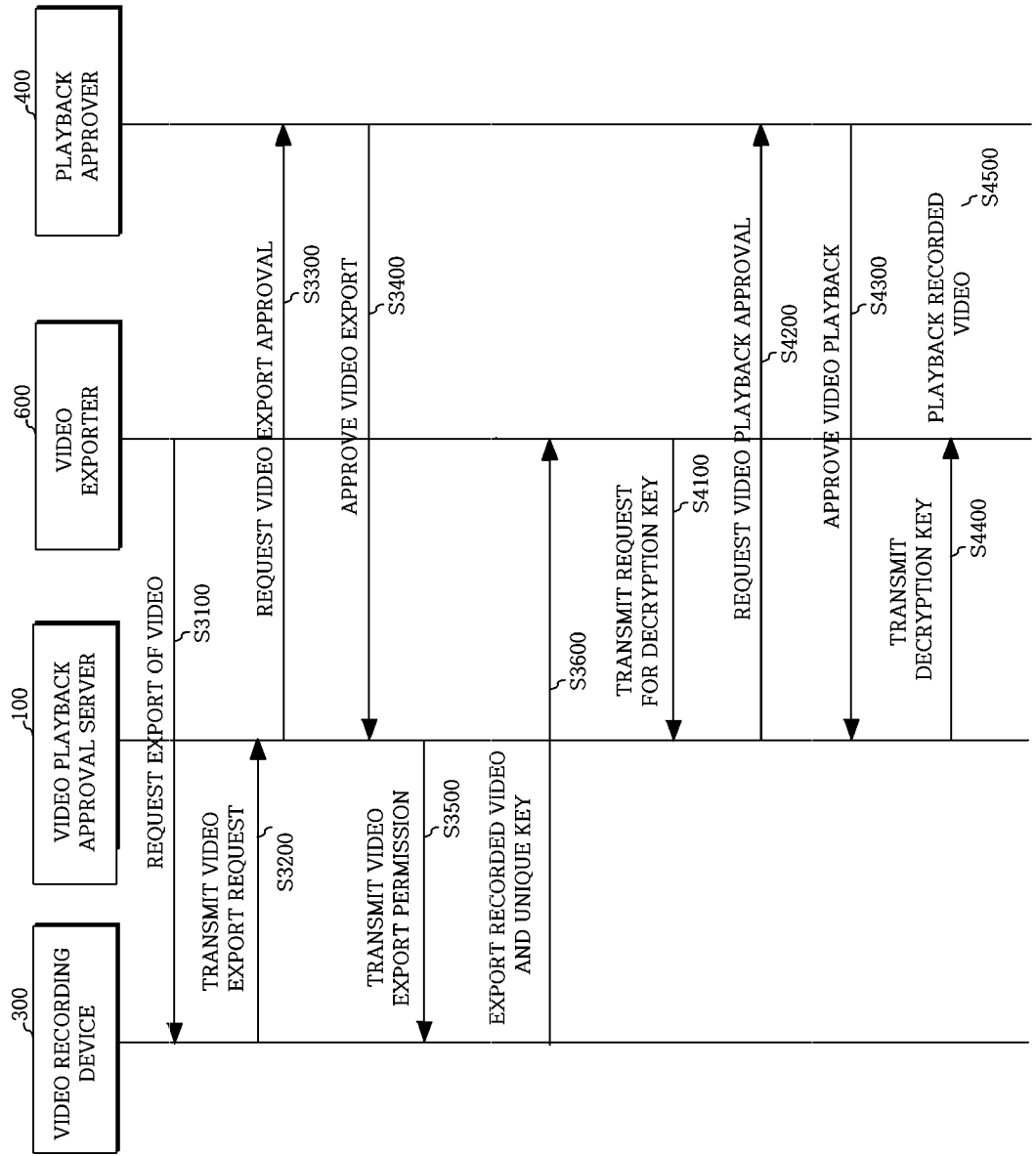
FIG. 3 is a flowchart illustrating an embodiment of a recorded video exporting process performed by a video playback system based on approval of a playback approver according to the present invention.

FIG. 3 is a flowchart illustrating an embodiment of a recorded video exporting process performed by the video playback system based on approval of the playback approver according to the present invention. In order to export the recorded video, a video exporter 600 requests export of the recorded video from the video recording device 300 (S3100).

Then, the video recording device 300 transmits the export request information on the recorded video to the video playback approval server 100, and the video export approval requesting unit 170 of the video playback approval server 100 receives the export request information on the recorded video (S3200).

Then, the video export approval requesting unit 170 of the video playback approval server 100 requests video export approval from the playback approver 400 corresponding to the playback approver information included in the metadata using the playback approval method (S3300).

For example, the video export approval requesting unit 170 may be implemented to request the video export approval by inputting an OTP to the playback approver 400 through email using an email address or through an SMS, an MMS, or an SNS using the mobile terminal's phone number, or to request the video playback approval by providing an interface for inputting information on biometrics such as a fingerprint or iris.

When the video export is approved by the playback approver 400 that has received the video export approval request using the playback approval method, the video export permitting unit 180 transmits export permission information on the recorded video to the video recording device 300.

When the playback approver 400 that has received the video export approval request enters an OTP or enters information on biometrics such as a fingerprint or iris to approve the video export (S3400), the video export permitting unit 180 of the video playback approval server 100 transmits the export permission information on the recorded video to the video recording device 300 (S3500).

Then, the video recording device 300 that has received the export permission information on the recorded video from the video playback approval server 100 exports the unique key and the encrypted recorded video to the video exporter 600 (S3600).

By implementing the present invention in this way, the export of the encrypted recorded video stored after being recorded by the video recording device may be permitted only when the video export is approved by the playback approver using the appointed playback approval method to restrict the export of the recorded video with sensitive personal information, and thus it is possible to efficiently prevent leakage of the personal information.

Meanwhile, according to an additional aspect of the present invention, the video playback approval requesting unit 150 may be implemented to, when the video playback approval requesting unit 150 receives the decryption key request information including the unique key from a terminal of the video exporter 600 to which the recorded video has been exported, verify the unique key and then request the video playback approval from the playback approver 400 corresponding to the playback approver information included in the metadata using the playback approval method.

In this case, the decryption key transmission unit 160 may be implemented to, when the video playback is approved by the playback approver 400 that has received the video playback approval request using the playback approval method, transmit the decryption key for decrypting the encrypted recorded video to the terminal of the video exporter 600.

The video exporter 600, to which the recorded video has been exported, transmits a request for the decryption key for playing the exported recorded video together with the unique key to the video playback approval server 100 (S4100).

Then, the video playback approval requesting unit 150 of the video playback approval server 100 verifies the unique key and then requests the video playback approval from the playback approver 400 corresponding to the playback approver information included in the metadata using the playback approval method (S4200). Then, the playback approver 400 that has received the video playback approval request approves the video playback using the playback approval method (4300).

When the video playback is approved by the playback approver 400 that has received the video playback approval request using the playback approval method, the decryption key transmission unit 160 of the video playback approval server 100 transmits the decryption key for decrypting the encrypted recorded video to the terminal of the video exporter 600 (S4400).

Then, the terminal of the video exporter 600 that has received the decryption key for decrypting the encrypted recorded video from the video playback approval server 100 decrypts the exported encrypted recorded video using the decryption key to play the recorded video (S4500).

By implementing the present invention in this way, the exported encrypted recorded video may be decrypted and played only when the video playback is approved by the playback approver using the appointed playback approval method, and thus it is possible to prevent leakage of the recorded video with sensitive personal information.

Meanwhile, according to an additional aspect of the present invention, the metadata may further include information on an encryption method and information on an encryption key length. For example, the encryption method may be any one of a full encryption method, a partial encryption method, and a network abstraction layer (NAL) unit encryption method.

Before performing the video recording, when the video recording device 300 that performs video recording determines the playback approver, the playback approval method, the encryption method, and the encryption key length and then transmits the video recording start notification information including the metadata including the playback approver information, the playback approval method information, the encryption method information, and the encryption key length information to the video playback approval server 100, the video playback approval server 100 generates an encryption key that corresponds to the encryption method and has the encryption key length, and transmits the generated encryption key to the video recording device 300.

Then, the video recording device 300 encrypts and stores the recorded video using the encryption key that corresponds to the encryption method and has the encryption key length, receives the video playback approval from the playback approver through the video playback approval server 100 using the playback approval method when playing the video, and then receives the decryption key required for playing the encrypted recorded video from the video playback approval server 100.

By implementing the present invention in this way, the encryption method and the encryption key length which are related to the encryption key required for encrypting the recorded video may be designated through the video recording device 300, and thus it is possible to efficiently encrypt the recorded video.

Meanwhile, according to an additional aspect of the present invention, the metadata may further include additional information for searching for the recorded video. For example, the additional information may include at least one of a recording location, a recording time, and a recording participant of the recorded video.

By implementing the present invention in this way, at least one of the recording location, the recording time, and the recording participant is included in the metadata of the recorded video stored after being encrypted by the video recording device 300, and thus it is possible to efficiently search for the recorded video by searching for the recording location, recording time, and recording participant.

Figure 4:
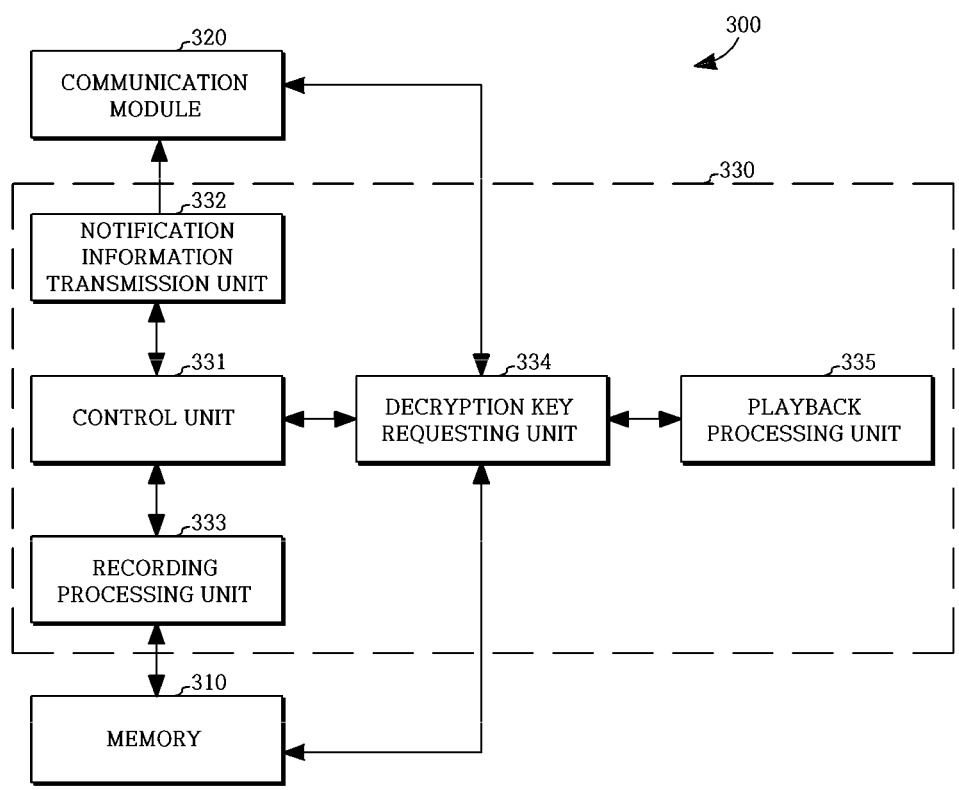
FIG. 4 is a block diagram illustrating a configuration of an embodiment of a video recording device of a video playback system based on approval of a playback approver according to the present invention.

FIG. 4 is a block diagram illustrating a configuration of an embodiment of the video recording device of the video playback system based on approval of the playback approver according to the present invention. As illustrated in FIG. 4, the video recording device 300 according to this embodiment includes a memory 310, a communication module 320, and a processor 330 in hardware, and includes a recording program executed by the processor 330 in software. In this case, the recording program code may be recorded in the memory 310.

The memory 310 stores an operating system (OS), the recording program code, an encrypted recorded video, a unique key for requesting a decryption key for decrypting an encrypted recorded video, or the like. In this case, the memory 310 may be a non-volatile memory such as a flash memory, an electrically erasable programmable read only memory (EEPROM), or the like, and may be implemented in the form of a hard disk drive (HDD), a solid-state drive (SSD), a micro secure digital (SD) card, or the like, but the present invention is not limited thereto.

The communication module 320 is connected to and communicates with each of the video playback approval server 100 and at least one IP camera 200. For example, the communication module 320 may be connected to and communicate with each of the video playback approval server 100 and at least one IP camera 200 through a wired or/and wireless IP-based network.

The processor 330 executes the OS and the recording program code, and the recording program includes a control unit 331, a notification information transmission unit 332, a recording processing unit 333, a decryption key requesting unit 334, and a playback processing unit 335.

The control unit 331 establishes a session with the video playback approval server 100 and at least one IP camera 200. For example, the control unit 331 may be implemented to establish a transport layer security (TLS) session with the video recording device 300 and the video playback approval server 100 or the IP camera 200 through the communication module 320.

TLS is a standard protocol designed to ensure end-to-end security and data integrity of the transport layer during communication between client/server application programs using Transmission Control Protocol/Internet Protocol (TCP/IP) networks.

Before video recording starts, the notification information transmission unit 332 transmits video recording start notification information including metadata including playback approver information and playback approval method information to the video playback approval server 100.

The video playback approval server 100 that has received the video recording start notification information from the video recording device 300 notifies a playback approver corresponding to the playback approver information included in the metadata that video recording is starting, and generates an encryption key for encrypting a recorded video and a unique key for requesting a decryption key for decrypting the encrypted recorded video and transmits the generated encryption key and unique key to the video recording device 300.

Meanwhile, when the video recording ends, the notification information transmission unit 332 transmits video recording end notification information to the video playback approval server 100. Then, the video playback approval server 100 that has received the video recording end notification information notifies the playback approver corresponding to the playback approver information included in the metadata that the video recording is ending.

The recording processing unit 333 records the video captured by the IP camera 200, encrypts the recorded video using the encryption key received from the video playback approval server 100, and stores the encrypted recorded video in the memory 310. Meanwhile, the recording processing unit 333 also stores the unique key for requesting the decryption key received from the video playback approval server 100 together with the encryption key in the memory 310.

When the decryption key requesting unit 334 receives a recorded video playback request from the playback requester 500, the decryption key requesting unit 334 transmits decryption key request information including the unique key to the video playback approval server 100.

Then, the video playback approval server 100 that has received the decryption key request information including the unique key verifies the unique key and then requests video playback approval from the playback approver 400 corresponding to the playback approver information included in the metadata using the playback approval method.

Then, when the video playback is approved by the playback approver 400 using the playback approval method, the video playback approval server 100 generates a decryption key for decrypting the encrypted recorded video and transmits the generated decryption key to the video recording device 300.

When the playback processing unit 335 receives the decryption key for decrypting the encrypted recorded video from the video playback approval server 100, the playback processing unit 335 transmits the decryption key to the playback requester 500 so that the playback requester 500 decrypts and plays the encrypted recorded video provided by the video recording device 300.

Meanwhile, the playback processing unit 335 may be implemented not to transmit the decryption key to the playback requester 500, and to play the recorded video by directly decrypting, by the playback requester 500, the encrypted recorded video requested for playback using the decryption key and providing the decrypted recorded video to the playback requester 500.

By implementing the present invention in this way, the decryption key that can decrypt the encrypted and stored recorded video may be generated only when video playback is approved by the playback approver using the appointed playback approval method, and transmitted to the video recording device, and thus it is possible to prevent leakage of the recorded video with sensitive personal information.

Meanwhile, according to an additional aspect of the present invention, the video recording device 300 may be implemented to generate metadata including playback approver information and playback approval method information for each recording unit and transmit video recording start notification information to the video playback approval server 100.

In the case of an operating room or the like, since a subject (surgical patient) of video data and participant (doctor and nurse participating in surgery) are different for each operation in the same place, it is easy to set different encryption/decryption keys for each recorded video unit and the subject of the video data is clear, and thus it is possible to designate a pre-approver (playback approver).

When the video recording device 300 generates the metadata including the playback approver information and the playback approval method information for each recording unit and transmits the video recording start notification information to the video playback approval server 100, the video playback approval server 100 generates encryption keys for encrypting the recorded video for each recording unit and unique keys for requesting decryption keys for decrypting the encrypted recorded video for each recording unit and transmits the generated encryption keys and unique keys to the video recording device 300.

Then, the video recording device 300 encrypts and stores the recorded video for each recording unit using the encryption keys, and when the playback requester 500 requests playback of the recorded video later, the video recording device 300 transmits the unique key for requesting the decryption key for decrypting only a portion of a recording unit requested to be played of the encrypted recorded video to the video playback approval server 100.

Then, the video playback approval server 100 verifies the unique key and then requests the video playback approval from the playback approver 400 using the playback approval method, and when the video playback is approved by the playback approver 400 using the playback approval method, the video playback approval server 100 transmits the decryption key for decrypting only a portion of a recording unit requested to be played of the encrypted recorded video to the video recording device 300.

Then, the video recording device 300 that has received the decryption key for decrypting only a portion of a recording unit requested to be played transmits the decryption key for decrypting only a portion of a recording unit requested to be played of the encrypted recorded video to the playback requester 500 so that only a portion of a recording unit requested to be played of the encrypted recorded video stored in the video recording device 300 is decrypted and played using the decryption key.

By implementing the present invention in this way, since it is possible to designate and manage the playback approver and the playback approval method for each recording unit, it is possible to efficiently manage the playback approval of the recorded video for each recording unit.

Meanwhile, according to an additional aspect of the present invention, the video recording device 300 may be implemented to discard the encryption key received from the video playback approval server 100 when the video recording ends.

By implementing the present invention in this way, when the video recording ends after the recorded video is encrypted and stored using the encryption key for encrypting the recorded video, the video recording device 300 discards the encryption key received from the video playback approval server 100, and thus the encryption key is not stored in the video recording device 300 after the video recording ends, and the present invention is strong in security.

Meanwhile, according to an additional aspect of the present invention, the video recording device 300 may be implemented to discard the decryption key received from the video playback approval server 100 when the video playback ends.

By implementing the present invention in this way, when the video playback performed by the playback requester 500 that decrypts and plays the encrypted recorded video stored in the video recording device 300 using the decryption key ends, the video recording device 300 discards the decryption key received from the video playback approval server 100, and thus the decryption key is not stored in the video recording device 300 after the video recording ends, and the present invention is strong in security.

That is, in the present invention, in the video playback approval server 100, the recorded video is not stored and only information on the encryption key and decryption key is stored, and in the video recording device 300, only the recorded video is stored and the encryption key and the decryption key are not stored. Therefore, since the recorded video and the encryption and decryption keys are not stored in the same device, and thus there is little chance of being exposed to hacking at the same time, the present invention is strong in security.

Meanwhile, according to an additional aspect of the present invention, the video recording device 300 performs multi-channel recording, and may be implemented in the form of a hybrid recording system in which the video playback approval server occupies only some of a plurality of channels and performs video playback management based on the approval of the playback approver.

By implementing the present invention in this way, when there are a plurality of video recording devices 300 that record, encrypt, and store videos, some of the video recording devices 300 may be managed in a conventional manner that does not require the approval of a playback approver, and the remaining video recording devices 300 may be hybridized to be managed in a video playback method based on approval of a playback approver.

However, the present invention is not limited thereto, and a conventional video recording system and the video playback system based on approval of the playback approver according to the present invention may be implemented to be mixed within the same channel.

As described above, in the present invention, a decryption key that can decrypt an encrypted and stored recorded video can be generated only when video playback is approved by a playback approver using an appointed playback approval method, and transmitted to a video recording device, and thus it is possible to prevent leakage of the recorded video with sensitive personal information.

Further, in the present invention, the export of the encrypted recorded video stored after being recorded by the video recording device can be permitted only when the video export is approved by the playback approver using the appointed playback approval method to restrict the export of the recorded video with sensitive personal information, and thus it is possible to efficiently prevent leakage of the personal information.

Further, in the present invention, since it is possible to designate and manage the playback approver and the playback approval method for each recording unit, it is possible to efficiently manage the playback approval of the recorded video for each recording unit.

Various embodiments of the present invention disclosed in this specification and drawings are merely for providing specific examples to easily explain the technical content of the present invention and are not intended to limit the scope of various embodiments of the present invention.

Therefore, the scope of various embodiments of the present invention should be interpreted as including all changes or modifications derived on the basis of the technical spirit of various embodiments of the present invention in addition to the embodiments disclosed herein.

Industrial Applicability

The present invention can be used for industrial applicability in the field of video playback technology and its application technology.

What is claimed is:

1. A video playback system based on approval of a playback approver which includes a video playback approval server comprising:
   a recording start processing unit configured to receive video recording start notification information including metadata including playback approver information and playback approval method information from a video recording device, and notify a playback approver corresponding to the playback approver information included in the metadata that video recording is starting;
   a key management unit configured to, after the recording start processing unit notifies that the video recording is starting, generate an encryption key for encrypting a recorded video and a unique key for requesting a decryption key for decrypting the encrypted recorded video, and transmit the generated encryption key and unique key to the video recording device;
   a playback-related information storage unit configured to match and store the metadata including the playback approver information and the playback approval method information, the encryption key for encrypting the recorded video, and the unique key for requesting the decryption key for decrypting the encrypted recorded video in a database (DB); and
   a recording end processing unit configured to receive video recording end notification information from the video recording device, and notify the playback approver corresponding to the playback approver information included in the metadata that the video recording is ending.

2. The video playback system based on the approval of the playback approver of claim 1, wherein the video playback approval server further includes:
   a video playback approval requesting unit configured to, upon receiving decryption key request information including the unique key from the video recording device that has received a recorded video playback request from a playback requester, verify the unique key and then request video playback approval from the playback approver corresponding to the playback approver information included in the metadata using a playback approval method; and a decryption key transmission unit configured to, when the video playback is approved by the playback approver that has received the video playback approval request using the playback approval method, transmit the decryption key for decrypting the encrypted recorded video to the video recording device.

3. The video playback system based on the approval of the playback approver of claim 1, wherein the playback approval method is a method using a one-time password (OTP) or biometrics.

4. The video playback system based on approval of the playback approver of claim 1, wherein the playback approver information is an email address or a mobile terminal's phone number.

5. The video playback system based on the approval of the playback approver of claim 4, wherein the notification that the video recording is starting and the notification that the video recording is ending are transmitted to the playback approver through email, a short message service (SMS), a multimedia message service (MMS), or a social network service (SNS).

6. The video playback system based on the approval of the playback approver of claim 1, wherein the video playback approval server further includes:

a video export approval requesting unit configured to receive export request information on the recorded video from the video recording device, and request video export approval from the playback approver corresponding to the playback approver information included in the metadata using the playback approval method; and a video export permitting unit configured to, when the video export is approved by the playback approver that has received a video export approval request using the playback approval method, transmit export permission information on the recorded video to the video recording device.

7. The video playback system based on the approval of the playback approver of claim 6, wherein, when the video playback approval requesting unit receives the decryption key request information including the unique key from a terminal of the video exporter, to which the recorded video has been exported, the video playback approval requesting unit verifies the unique key and then requests the video playback approval from the playback approver corresponding to the playback approver information included in the metadata using the playback approval method.

8. The video playback system based on the approval of the playback approver of claim 7, wherein, when the video playback is approved by the playback approver that has received the video playback approval request using the playback approval method, the decryption key transmission unit transmits the decryption key for decrypting the encrypted recorded video to the video exporter terminal.

9. The video playback system based on the approval of the playback approver of claim 1, wherein the metadata further includes information on an encryption method and information on an encryption key length.

10. The video playback system based on the approval of the playback approver of claim 9, wherein the encryption method is any one of a full encryption method, a partial encryption method, and a network abstraction layer (NAL) unit encryption method.

11. The video playback system based on the approval of the playback approver of claim 1, wherein the metadata further includes additional information for searching for the recorded video.

12. The video playback system based on the approval of the playback approver of claim 11, wherein the additional information includes at least one of a recording location, a recording time, and a recording participant of the recorded video.

13. The video playback system based on the approval of the playback approver of claim 1, further comprising:

an Internet protocol (IP) camera configured to capture a video; and a video recording device configured to record and store the video captured through the IP camera.

14. The video playback system based on the approval of the playback approver of claim 13, wherein the video recording device generates metadata including playback approver information and playback approval method information for each recording unit and transmits video recording start notification information to the video playback approval server.

15. The video playback system based on the approval of the playback approver of claim 13, wherein, when the video recording ends, the video recording device discards the encryption key received from the video playback approval server.

16. The video playback system based on the approval of the playback approver of claim 13, wherein, when the video recording ends, the video recording device discards the decryption key received from the video playback approval server.

17. The video playback system based on the approval of the playback approver of claim 13, wherein the video recording device performs multi-channel recording, and is implemented in the form of a hybrid recording system in which the video playback approval server occupies only some of a plurality of channels and performs video playback management based on the approval of the playback approver.

* * * * *